Jan. 3, 1967  AKIHIKO SAKUMA  3,296,525
SYSTEM FOR MEASURING TIME INTERVALS BY MEANS OF TIMING PULSES
Filed Jan. 12, 1965  2 Sheets-Sheet 1

INVENTOR
AKIHIKO SAKUMA

BY  *Ernest Montague*
ATTORNEY

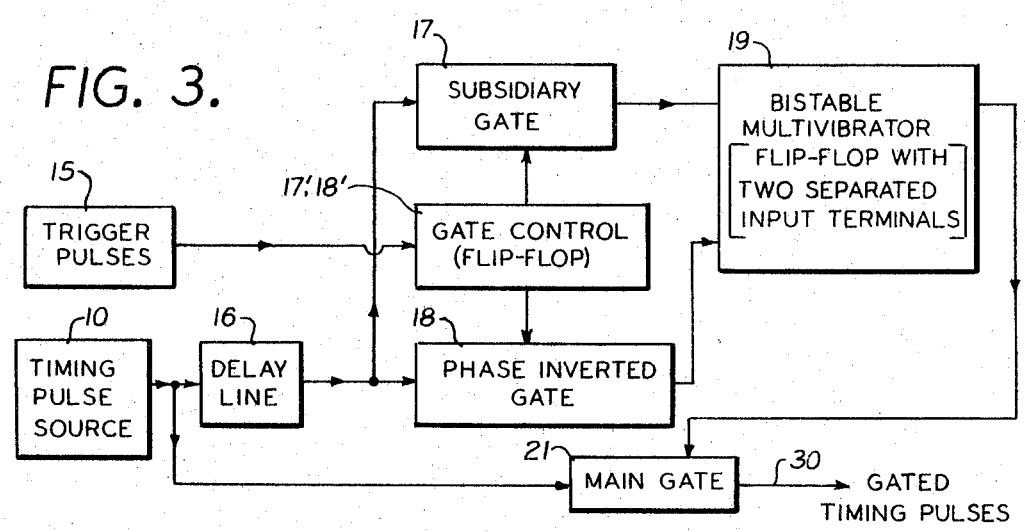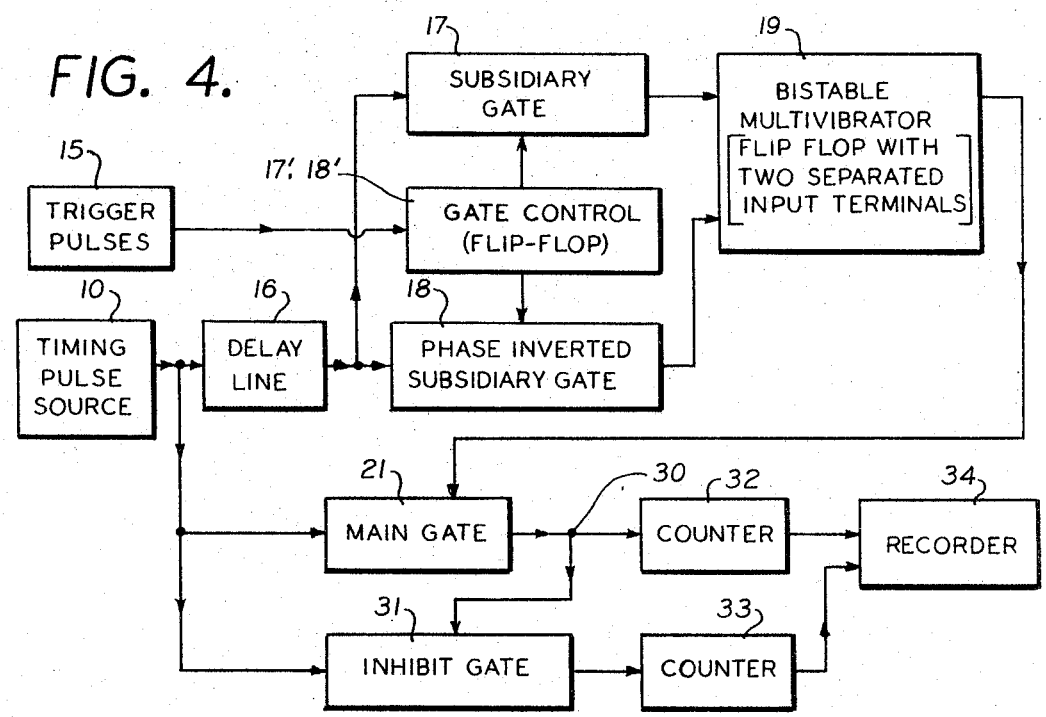

United States Patent Office 3,296,525
Patented Jan. 3, 1967

3,296,525
SYSTEM FOR MEASURING TIME INTERVALS BY
MEANS OF TIMING PULSES
Akihiko Sakuma, Tokyo, Japan, assignor to Agency of
Industrial Science Technology, Tokyo, Japan, a corporation of Japan
Filed Jan. 12, 1965, Ser. No. 425,002
Claims priority, application Japan, Aug. 7, 1959,
34/25,238
2 Claims. (Cl. 324—68)

The present invention relates to an electronic time interval measuring system.

This is a continuation-in-part of the co-pending patent application Serial No. 13,560, filed March 8, 1960, now abandoned.

It is one object of the present invention to provide a measuring system wherein the distance between pulses which determines the time interval to be measured is measured through the use of timing pulses passed through gates with the pulse amplitude of a pulse from the signal from the time phenomenon to be measured generated at any phase position in relation to the timing pulse.

It is another object of the present invention, wherein upon a timing pulse passing through a gate during the transit time during which a gate is opening or closing, the amplitude of the timing pulse is either held at a definite standard value, which hereinafter will be referred to as an amplitude of 1, or alternatively has a zero value, and does not remain at an indefinite value between 0 and 1.

With these and other objects in view which will become apparent in the following detailed description, the present invention will be clearly understood in connection with the accompanying drawings, in which:

FIG. 3 is a more detailed block diagram of the diagram disclosed in FIG. 1;

FIG. 4 is a more detailed block diagram of the diagram disclosed in FIG. 2; and

Figure 1:
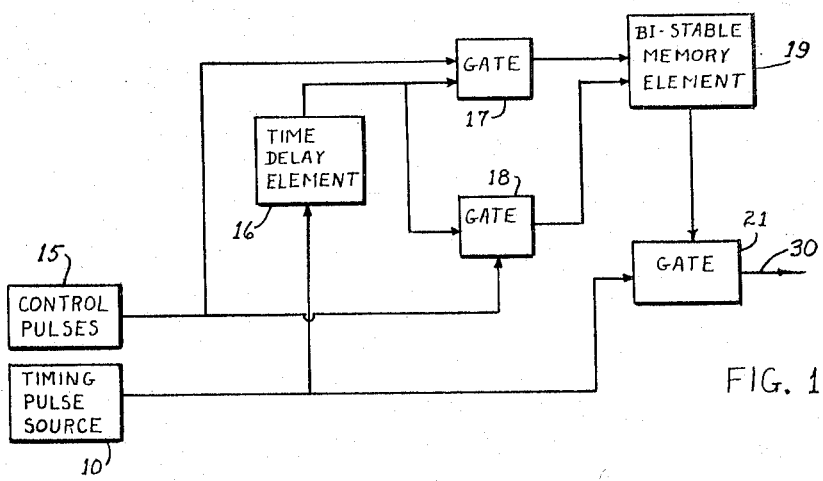
FIGURE 1 is a block diagram of a system based on the principle of the present invention.
Figure 5:
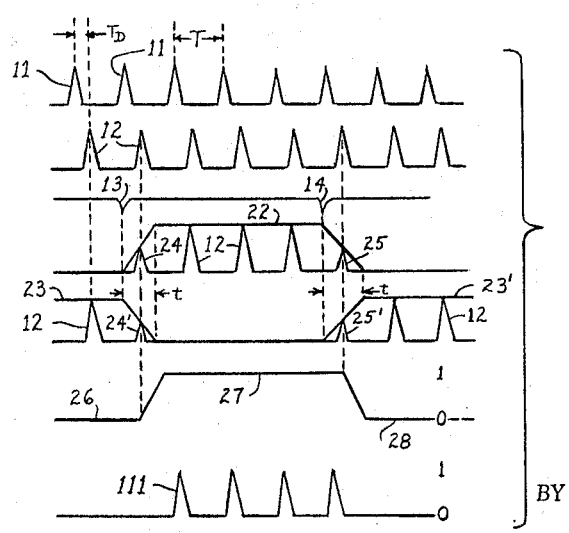
FIG. 5 shows the waveforms present at several points in the embodiments of FIGS. 1 to 4 during operation of the system.

Referring now to the drawings, FIG. 1 is a block diagram to illustrate the principle of the present invention and the waveforms generated by the various elements in the block diagram are illustrated in FIG. 5. In the operation of the circuitry, timing pulse source 10 introduces a timing pulse 11 into the circuit while control pulses 13 and 14, which are a signal from the time phenomenon to be measured, are introduced into the circuit by element 15. A time delay element 16 in series with source 10 receives timing pulse 11 and feeds a delayed timing pulse 12 to each of the gates 17 and 18. Also, control pulses 13 and 14 are fed to gates 17 and 18 to open and close those gates. The control pulse which opens one of the gates also closes the other gate and vice versa. Both gates 17 and 18 lead to a bi-stable memory element 19 which in turn feeds into a gate 21.

The timing pulse 11, having a time period T introduced to the system at the timing pulse source 10, is fed through the time delay element 16, which emerges now from the time delay element 16 as a timing pulse 12 with the same time period T as timing pulse 11, but delayed by a time $T_D$. The signal from the time phenomenon to be measured shown in FIG. 1 as being emitted by element 15 is in the form of control pulses 13 and 14 with pulse 13 as the start of the time phenomenon to be measured. Before the generation of pulse 13 the circuit is in the condition that gate 17 is closed and gate 18 is open. In the waveform drawings of FIG. 5, the envelope 22 depicts the open time of gate 17 and the envelopes 23 and 23' depict open times of gate 18. Accordingly, the delayed timing pulse 12 passes through gate 18 and is applied to one input terminal of the bi-stable memory element 19 which remains in one stable condition. At that time gate 21 is in a closed state.

Bi-stable memory element 19 is a bi-stable multivibrator having two independent input terminals for realizing the two stable states of the multivibrator successively. One of the input terminals will receive a train of gated delayed timing pulses 12, as shown within envelope 22, which has passed through gate 17 in the event that gate 17 is open, thereby maintaining bi-stable memory element 19 in one stable state. When gate 18 is opened and gate 17 closed, the multivibrator of bi-stable memory element 19 will allow for receiving the train of gated delayed timing pulses 12 passing through gate 18 and depicted among the waveforms as contained within envelopes 23 and 23' while maintaining an opposite state.

Now, when control pulse 13 is generated at any phase position for a waveform of a delayed timing pulse 12, gates 17 and 18 upon receiving the pulse 13 will operate to open gate 17, while closing gate 18. These operations are completed during a transit time $t$ as shown in FIG. 5. When control pulse 14 is generated at the end of the time phenomenon to be measured, again during a transit time $t$, gate 17 is closed and gate 18 is opened. A delayed timing pulse may or may not occur during transit time $t$ depending upon the time period T between timing pulses, the occurrence of control pulses and the length of transit time $t$. In the particular case illustrated in the waveforms of FIG. 5, the control pulses 13 and 14 occur at a time to cause the following, and the next succeeding delayed timing pulses 24, 24' and 25, 25', respectively, to occur during the interval of transit time $t$. When this first output pulse 24 happens to pass through gate 17 during transit time $t$, it may be of any value of amplitude between 0 and a maximum amplitude standard set as 1. In a like manner, the first output pulse 25' passing through gate 18 may be of any value of amplitude between 0 and 1. At this time, the probability of the passing of a timing pulse through a gate with amplitude in between the parameters of 0 and 1 during the transit time of one reversal of gates 17 and 18 is equal to $t/T$, and consequently if it were assumed that $t \geq T$, a pulse of unstable amplitude would be produced. However, since it is technically feasible to make the probability in the order of ½ or ⅕, with the reversal of gates 17 and 18, either one pulse of unstable amplitude will be produced, or none at all.

The state of operation of the bi-stable memory element 19 is depicted by the waveform 26–28, where portion 26 depicts element 19 in one stable state or 0 state before the opening of gate 17; portion 27 depicts element 19 after opening of gate 17 and the passing through of the first delayed timing pulse of sufficient amplitude to switch element 19 to its other stable state or 1 state; and portion 28 again depicts the 0 state of element 19 when it returns to its first stable state upon the opening of gate 18 and the passing of the first delayed timing pulse from that gate to the respective input on element 19 to cause the switch. In the particular case illustrated, the first delayed timing pulse through gate 17 is a shortened pulse 24 which may or may not be of sufficient amplitude to cause a switch of stable states of bi-stable memory element 19. In a like manner, the first delayed timing pulse through gate 18 is the shortened pulse 25' also which may or may not be of sufficient amplitude to cause a switch of stable states of bi-stable memory element 19. In the drawing of waveform 26–28, both pulses 24 and 25' have been considered as of sufficient amplitude to cause switching in element 19. Depending upon whether this amplitude of pulses 24 and 25' are sufficient or not, bi-stable memory element 19 will be reversed or not, only after a time inherent to element 19 has elapsed. A waveform with a transit state from portion 26 to portion 27 and from portion 27 to portion 28 is imparted to gate 21.

As shown in FIG. 1, gate 21 also receives an undelayed timing pulse train of pulses 11 directly from timing pulse source 10. The output of gate 21 is composed of undelayed pulses 111 as are passed through gate 21 when it is in the open state. The operation of gate 21 is controlled by the bi-stable memory element 19 which opens gate 21 whenever bi-stable memory element 19 is in the stable state of 1 acting as an open gate in this condition. The timing pulses 111 are passed through at the amplitude of 1.

The 0 or 1 state of bistable memory element 19 is reached after a time period inherent to element 19. Even with shortened delayed timing pulses 24 and 25' occurring during and due to the reversal of gates 17 and 18, the stable 0 or 1 state is reached after this time period determined by time period T and delay time $T_D$, and usually for practical purposes amounting to $T-T_D$. Therefore, when a timing pulse 11, not delayed, has entered into gate 21, the gate is open or closed entirely and consequently, the first pulse presented at the output 30 of gate 21 is completely measured. Furthermore, zeroing of the amplitude of the pulse preceding pulse 111 by more than the time period T is apparent from the fact that the amplitude of the pulse 12 under envelope 23 two pulses before the gate 18 is closed, is 1, at which time gate 21 is closed. The first pulse 111 is at amplitude 1 since the pulse after pulse 24 has the amplitude 1 and gate 21 is completely open. In a similar manner, when pulse 14 closes gate 17 with the forming of unstable pulses 25 and 25', bi-stable memory element 19 is held at states 1 or 0, waveform portion 27 or 28 after the time period inherent to element 19 has elapsed, as when gate 17 was opened, and consequently the pulse following the last pulse 111 is also measured.

An error between a true time and a measured time dependent as to whether or not the unstable pulse derived from the unstable amplitude during the transit time of the gates opening and closing is measured, calculated at output 30 or gate 21 and measured through the system of FIG. 1, is within ± 1 count.

Figure 2:
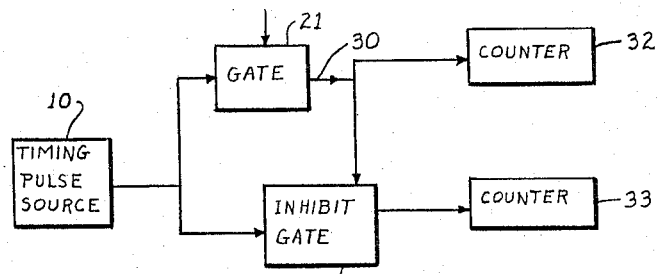
FIG. 2 illustrates connections to additional parts to disclose a preferred system for carrying out the objects of the present invention.

This accuracy of the present invention is effective in the case of making a continuous series of measurements, as may be done with additional elements shown in FIG. 2. An inhibit gate 31 and counters 32 and 33 have been added to the circuitry of FIG. 1. The inhibit gate 31 has an output of zero value whenever two inputs, namely timing pulses 11 from timing pulse source 10 and pulses 111, output 30 of gate 21, are received by it. When the output 30 is zero, the inhibit gate 31 has at its output, timing pulses of the same phase as timing pulses 11 with an amplitude of 1. Since counter 32 counts pulses 111 from gate 21 and counter 33 counts pulses 11 which pass through the output of inhibit gate 31, which pulses pass through to counter 33 only when there is no output from gate 21, the counts made by counters 32 and 33 are made without error or duplication and accordingly, when many signals from time phenomenon to be measured are received from element 15, the time of any two of these pulse generated times combined can be measured within an error of ±1 count.

In the present invention, as the method is used, through the indication of the presence of the unstable amplitude pulse in conjunction with the bi-stable memory element after elapse of a time period inherent to the bi-stable memory element, the measurements are taken unaffected by pulse amplitude, whereas if such measurements were taken by a so-called amplitude discrimination method, the measuring of the timing pulses over a few megacycles could not be made due to the unstable states encountered. In accordance with the present invention, the inherent time period of the bi-stable memory element 19 can be made below .05 $\mu$/sec. without difficulty, and consequently a complete measuring of the gated timing pulse above 20 megacycles can be effected and a continuous measuring precision of time is further increased.

If in this system the transmit time of the gate is large and more than two pulses are passed at the unstable amplitude through the gate, the opening and closing of gates 17 and 18 takes the course of a simple decrease, respectively, and do not disrupt the measuring of the output of gate 21.

Furthermore, the phase relationship between the two timing pulses 11 and 12 is not limited to the delay of $T_D$, and the relay of $T-T_D$ or $nT \pm T_D$ (with $n$ an integer above 1) can be put into effect and an apparent preceding timing pulse can be imparted to gate 21 in place of timing pulse 11 and a new delayed pulse can be imparted to the gates 17 and 18 in place of delayed timing pulse 12.

Referring now again to the drawings and in particular to FIGS. 3 and 4, a gate control 17'–18' is added to the circuit of FIGS 1 and 2.

The bi-stable multivibrator 19 comprises a "Flip-Flop" circuit, two input terminals of which are separated from each other and connected to the gates 17 and 18, respectively. Thus, the bi-stable multivibrator 19 keeps one of two stable states as long as the input signal is given to only one of these two input terminals through the gate 17 or through the gate 18.

The inhibit gate 31 produces no output pulse when two timing pulses are emitted through the timing pulse source 10 and through the gate 31. When the gated timing pulse signal 30 disappears by closing of the main gate 21, the inhibit gate 31 produces a timing pulse signal of the same repetition rate as the timing pulse signal from the timing pulse source 10.

Moreover, the present system is not limited to the formation of an electronic circuit and can be applied to a mechanical system or electromechanical system such as a relay.

It will be obvious to those skilled in the art that various changes may be made without departing from the spirit of the invention and therefore, the invention is not limited to what is shown in the drawings and described in the specification but only as indicated in the appended claims.

I claim:

1. A system for measuring time intervals between control pulses, comprising pulse means for generating timing pulses, control means for generating control pulses, a pulse delay unit, a first gate unit for opening and closing when receiving successive control pulses and for passing delayed timing pulses therethrough when open and when receiving delayed timing pulses, a second gate unit for alternately closing and opening when receiving successive control pulses, said second gate unit opening and closing when said first gate unit closes and opens, respectively, and for passing delayed timing pulses therethrough when said second gate is open and is receiving delayed timing pulses.

an AND gate for passing timing pulses through said AND gate when receiving both timing pulses and a square wave signal, means responsive to timing pulses passing through said AND gate for counting said timing pulses passing through said AND gate, a first conductor means connected from said pulse means to said pulse delay unit and to said AND gate for passing said timing pulses to said pulse delay unit and to said AND gate, a second conductor means connected from said pulse delay unit to said first gate unit and to said second gate unit for passing delayed timing pulses to said first and second gate units, a third conductor means connected from said control means to said first gate unit and to said second gate unit for passing control pulses to said first and second gate units, a bistable multivibrator for generating a substantially square wave signal when receiving delayed timing pulses from one of said gate units, a fourth conductor means connected from said first gate unit to said multivibrator for passing delayed timing pulses from said first gate unit to said multivibrator, a fifth conductor means connected from said second gate unit to said multivibrator for passing delayed timing pulses from said second gate unit to said multivibrator, and a sixth conductor means connected from said multivibrator to said AND gate for passing said square wave signal to said AND gate.

2. The system for measuring time intervals between control pulses, as set forth in claim 1, further comprising an inhibit gate unit having a first input portion and a second input portion, for passing timing pulses therethrough only when said first input portion is receiving timing pulses and when said second input portion is not receiving timing pulses, counting means responsive to timing pulses passing through said inhibit gate for counting said timing pulses passing through said inhibit gate, a seventh conductor means connected from said AND gate to said second input portion for passing timing pulses passing through said AND gate to said inhibit gate, said first conductor means further connected to said first input portion for passing timing pulses to said inhibit gate.

References Cited by the Examiner

UNITED STATES PATENTS 2,928,045   3/1960   Renick et al. _____ 324—68

RUDOLPH V. ROLINEC, *Primary Examiner.*

WALTER L. CARLSON, *Examiner.*

M. J. LYNCH, *Assistant Examiner.*